(12) United States Patent
Best et al.

(10) Patent No.: US 11,536,857 B2
(45) Date of Patent: Dec. 27, 2022

(54) SURFACE TRACKING ON A SURVEY POLE

(71) Applicant: Trimble Inc., Sunnyvale, CA (US)

(72) Inventors: Gregory C. Best, San Francisco, CA (US); Shawn Weisenburger, Denver, CO (US)

(73) Assignee: Trimble Inc., Sunnyvale, CA (US)

( * ) Notice: Subject to any disclaimer, the term of this patent is extended or adjusted under 35 U.S.C. 154(b) by 301 days.

(21) Appl. No.: 16/721,419

(22) Filed: Dec. 19, 2019

(65) Prior Publication Data

US 2021/0190969 A1  Jun. 24, 2021

(51) Int. Cl.
| | | |
|---|---|---|
| *G01S 19/48* | (2010.01) | |
| *G01S 19/42* | (2010.01) | |
| *G01C 11/02* | (2006.01) | |
| *G01S 19/40* | (2010.01) | |

(52) U.S. Cl.
CPC .............. *G01S 19/48* (2013.01); *G01S 19/42* (2013.01); *G01C 11/02* (2013.01); *G01S 19/40* (2013.01)

(58) Field of Classification Search
CPC .......... G01S 19/48; G01S 19/00; G01S 19/40; G01S 19/42; G01C 11/02
USPC ............... 342/357.31, 357.25, 357.2, 357.23
See application file for complete search history.

(56) References Cited

U.S. PATENT DOCUMENTS

| | | |
|---|---|---|
| 5,142,357 A | 8/1992 | Lipton et al. |
| 5,255,441 A | 10/1993 | Burgess et al. |
| 5,699,444 A | 12/1997 | Palm |
| 5,739,785 A | 12/1998 | Allison et al. |
| 5,903,235 A | 5/1999 | Nichols |
| 5,977,908 A | 11/1999 | Nichols |
| 6,052,083 A | 4/2000 | Wilson |
| 6,067,046 A | 5/2000 | Nichols |
| 6,094,625 A | 7/2000 | Ralston |
| 6,140,957 A | 10/2000 | Wilson et al. |
| 6,330,503 B1 | 12/2001 | Sharp et al. |
| 6,480,148 B1 | 11/2002 | Wilson et al. |
| 6,657,734 B1 | 12/2003 | Monz et al. |

(Continued)

FOREIGN PATENT DOCUMENTS

| | | |
|---|---|---|
| DE | 10 2007 061384 A1 | 6/2009 |
| DE | 10 2011 077854 A1 | 12/2012 |

(Continued)

OTHER PUBLICATIONS

"3D Stereo Camera & Rendering," 3D Stereo Rendering, © 2011, 11 pages retrieved Feb. 21, 2020 from the internet at: http://www.c4dcafe.com/reviews/r13/3dstereo.html.

(Continued)

*Primary Examiner* — Chuong P Nguyen
(74) *Attorney, Agent, or Firm* — Kilpatrick Townsend & Stockton LLP

(57) ABSTRACT

A surveying pole is part of a primary surveying system (e.g., a Global Navigation Satellite System (GNSS) or a total station). Cameras are mounted to the surveying pole and used for ground tracking as the survey pole is moved from a place where the primary surveying system is unimpeded to an environment where the primary surveying system is impaired (e.g., to a GNSS-impaired environment or to a position that is blocked from view of the total station). Using ground tracking and/or other sensors, surveying can be continued even though the primary surveying system is impaired.

20 Claims, 9 Drawing Sheets

(56) References Cited

U.S. PATENT DOCUMENTS

| | | | |
|---|---|---|---|
| 6,688,012 B1 | 2/2004 | Crain et al. | |
| 7,110,762 B1 | 9/2006 | Cameron et al. | |
| 7,646,339 B2* | 1/2010 | Green | G01C 15/00 342/357.29 |
| 7,669,341 B1 | 3/2010 | Carazo | |
| 7,889,124 B2* | 2/2011 | Islam | G01S 5/0027 342/357.2 |
| 7,978,182 B2 | 7/2011 | Ording et al. | |
| 8,229,166 B2 | 7/2012 | Teng et al. | |
| 8,284,254 B2 | 10/2012 | Romanowich et al. | |
| 8,508,595 B2 | 8/2013 | An | |
| 8,427,632 B1 | 12/2013 | Nash et al. | |
| 8,634,595 B2 | 1/2014 | Song et al. | |
| 8,769,838 B2 | 7/2014 | Ward | |
| 8,934,017 B2 | 1/2015 | Chen et al. | |
| 9,109,889 B2* | 8/2015 | Soubra | G01C 15/00 |
| 9,182,229 B2* | 11/2015 | Grässer | G01C 15/06 |
| 9,222,771 B2 | 12/2015 | Rosengaus et al. | |
| 9,235,763 B2 | 1/2016 | Joyce et al. | |
| 9,247,239 B2 | 1/2016 | He et al. | |
| 9,470,511 B2 | 10/2016 | Maynard et al. | |
| 9,513,120 B2* | 12/2016 | Briggs | G01C 15/00 |
| 9,541,392 B2* | 1/2017 | Dusha | G01C 15/06 |
| 9,710,919 B2 | 7/2017 | Teng et al. | |
| 9,879,993 B2* | 1/2018 | McFadden | G01C 11/04 |
| 10,168,153 B2* | 1/2019 | Grässer | G01C 15/06 |
| 10,371,518 B2* | 8/2019 | Siercks | G01S 19/14 |
| 10,563,980 B2* | 2/2020 | Edelman | G01C 11/02 |
| 11,047,989 B2* | 6/2021 | Sano | G01S 19/45 |
| 11,175,134 B2* | 11/2021 | Weisenburger | H04N 5/2257 |
| 2002/0146164 A1 | 10/2002 | Chikahisa et al. | |
| 2006/0012777 A1 | 1/2006 | Talbot et al. | |
| 2006/0170785 A1 | 8/2006 | Mashitani et al. | |
| 2007/0008515 A1 | 1/2007 | Otani et al. | |
| 2007/0052950 A1 | 3/2007 | Taylor et al. | |
| 2007/0104353 A1 | 5/2007 | Vogel | |
| 2009/0110019 A1 | 4/2009 | Houde-Walter et al. | |
| 2009/0138233 A1 | 5/2009 | Kludas et al. | |
| 2009/0222237 A1 | 9/2009 | Otani et al. | |
| 2009/0224153 A1 | 9/2009 | Houde-Walter | |
| 2010/0253931 A1 | 10/2010 | Meier et al. | |
| 2011/0066375 A1 | 3/2011 | France et al. | |
| 2011/0235923 A1 | 9/2011 | Weisenburger | |
| 2011/0243432 A1 | 10/2011 | Hirsch | |
| 2011/0288818 A1 | 11/2011 | Thierman et al. | |
| 2012/0010847 A1 | 1/2012 | Hamel et al. | |
| 2012/0013736 A1 | 1/2012 | Graesser | |
| 2012/0163656 A1 | 6/2012 | Wang et al. | |
| 2012/0182417 A1 | 7/2012 | Everett | |
| 2012/0188529 A1 | 7/2012 | France | |
| 2012/0330601 A1* | 12/2012 | Soubra | G01S 1/725 702/150 |
| 2013/0162469 A1 | 6/2013 | Zogg et al. | |
| 2014/0062772 A1 | 3/2014 | Jasiobedzki et al. | |
| 2014/0156219 A1* | 6/2014 | Soubra | G01C 15/06 702/150 |
| 2014/0247439 A1 | 9/2014 | Neier et al. | |
| 2014/0267700 A1* | 9/2014 | Wang | G01S 19/51 348/135 |
| 2014/0375773 A1 | 12/2014 | He et al. | |
| 2015/0109407 A1 | 4/2015 | Giger | |
| 2016/0012590 A1 | 1/2016 | McFadden et al. | |
| 2016/0078636 A1 | 3/2016 | Teng et al. | |
| 2016/0138919 A1 | 5/2016 | Green et al. | |
| 2016/0334939 A1 | 11/2016 | Dawson et al. | |
| 2017/0067739 A1 | 3/2017 | Siercks et al. | |
| 2018/0017384 A1* | 1/2018 | Siercks | H04N 5/23296 |
| 2018/0180416 A1* | 6/2018 | Edelman | G01C 15/002 |
| 2019/0094388 A1 | 3/2019 | Görcke | |
| 2019/0242706 A1 | 8/2019 | Siercks et al. | |
| 2020/0355499 A1* | 11/2020 | Hinderling | G01C 15/002 |
| 2020/0357134 A1 | 11/2020 | Lee et al. | |
| 2021/0055102 A1* | 2/2021 | Richter | G01C 15/00 |

FOREIGN PATENT DOCUMENTS

| | | |
|---|---|---|
| EP | 2 431 708 A1 | 3/2012 |
| EP | 2 458 405 A1 | 5/2012 |
| EP | 2 573 513 A1 | 3/2013 |
| WO | 2006/074290 A2 | 7/2006 |
| WO | 2012/037139 A2 | 3/2012 |

OTHER PUBLICATIONS

Wikipedia, Scheimpflug Principle, 9 pages Retrieved from the internet Mar. 3, 2020 at: https://en.wikipedia.org/wiki/Scheimpflug_principle.

International Search Report and Written Opinion for Application No. PCT/US2020/066222, dated Apr. 12, 2021, 16 pages.

U.S. Appl. No. 16/721,401 Final Office Action dated Jun. 22, 2021, 20 pages.

U.S. Appl. No. 16/721,401 Notice of Allowance dated Aug. 9, 2021, 7 pages.

U.S. Appl. No. 16/721,401 Non-Final Office Action dated Jan. 26, 2021, 18 pages.

International Search Report and Written Opinion for Application No. PCT/US2013/060202 dated Dec. 20, 2013, 12 pages.

International Preliminary Report on Patentability for Application No. PCT/US2013/060202 dated Apr. 2, 2015, 9 pages.

International Search Report and Written Opinion for Application No. PCT/US2014/065240 dated Jun. 29, 2015, 18 pages.

Invitation to Pay Additional Fees and, Where Applicable, Protest Fee for Application No. PCT/US2014/065240 mailed Feb. 23, 2015, 9 pages.

Ti, "Total Station R-400 Series, Instruction Manual," 2009, XP055167787, Chapter 10-RDM, retrieved from http://www.pentaxsurveying.com/en/pdfs/R400-MANUAL-PTL-EN.pdf on Feb. 5, 2015, 144 Pages.

Morgan, et al. "Aerial Mapping," In: Aerial Mapping, CRC Press LLC, 2002, XP055167782, ISBN: 978-1-56-670557-8, Chapter 6, paragraph 6.2.1-2.2., Fig. 6.1, 15 pages.

International Preliminary Report on Patentability for Application No. PCT/US2020/066222, dated Jun. 30, 2022, 10 pages.

* cited by examiner

SURFACE TRACKING ON A SURVEY POLE

BACKGROUND

This disclosure relates in general to surveying systems. Surveying determines positions of points relative to each other and/or to the Earth. Surveying can be used in many applications by land surveyors, construction professionals, and civil engineers. Surveying often uses specialized and/or expensive equipment, such as laser levels, surveying rods, total stations, laser scanners, and GNSS (Global Navigation Satellite System) receivers. Examples of GNSS systems include GPS (Global Positioning System), GLONASS (Russia), BeiDou Navigation Satellite System (China), and Galileo (European Union). Cameras have been used to track movement of a device, e.g., U.S. Pat. No. 9,710,919, issued on Jul. 18, 2017. There exists a need for improved surveying systems that are less expensive, more robust, and/or easier to use.

BRIEF SUMMARY

This disclosure relates to surveying in GNSS-impaired environments. A GNSS system uses satellite signals to provide autonomous geodetic positioning. GNSS positioning is generally robust for open environments. However, trying to determine a precise position (e.g., precision within 5 centimeters) of a point next to an obstruction (e.g., next to a building or under an overpass) can be challenging because the obstruction can block GNSS signals to a GNSS receiver. Though a total station could be used to precisely measure a point in a GNSS-impaired environment, total stations can be expensive, slow to set up necessary equipment, and/or the user could be blocked from viewing the total station. There is a need for being able to use a surveying system that can be used where GNSS signals are partially or fully blocked and/or where positions can be measured not within a view of a total station.

In certain embodiments, an apparatus for determining position in an environment where surveying is impaired comprises a pole; at least a portion of a surveying system integrated with the pole; a camera integrated with the pole; and one or more processors configured to: determine a first position of the pole using the surveying system, wherein the first position is determined in three dimensions of a coordinate system; determine a first orientation of the pole while the pole is at the first position, wherein: the first orientation includes a heading and two degrees of tilt, and a combination of the first position of the pole and the first orientation of the pole provides a first pose of the pole; acquire a plurality of images using the camera, wherein: the camera is coupled with the pole, and the plurality of images are acquired as the pole is moved from the first position to a second position; process the plurality of images to calculate a change in pose from the first position to the second position; and/or calculate a second pose of the pole at the second position based on the first pose and the change in pose. In some embodiments, the surveying system is a Global Navigation Satellite System (GNSS) surveying system, and the at least the portion of the surveying system integrated with the pole is a GNSS receiver; the surveying system comprises a total station and a target, and the at least the portion of the surveying system integrated with the pole is the target; calculating the second pose of the pole is further based on data from the surveying system; data from the surveying system used for calculating the second pose of the pole includes data from at least one satellite of a Global Navigation Satellite System (GNSS) while there is data from an insufficient number of satellites to form a GNSS solution; the apparatus further comprises an inertial measurement unit integrated with the pole; calculating the second pose is further based on data from the inertial measurement unit as the pole is moved from the first position to the second position; the camera is configured to face downward, toward the ground, as the pole is moved from the first position to the second position; the one or more processors are further configured to calibrate sensors integrated with the pole before the pole is moved from the first position to the second position; calibration includes revising measurements of the camera in relation to the pole based on input from sensors integrated with the pole, the camera, or both sensors integrated with the pole and the camera; the one or more processors are further configured to initialize values for sensors integrated with the pole before the pole is moved from the first position to the second position; initialization includes calculating a relation of the camera to the first pose; the one or more processors are further configured to initializing values for sensors integrated with the pole before the pole is moved from the first position to the second position; initialization includes a determination of scale for the camera; the camera is a first camera; the plurality of images is a first plurality of images; a second camera is integrated with the pole closer to an end of the pole than the first camera; the one or more processors are further configured to acquire a second plurality of images, using the second camera, as the pole is moved from the first position to the second position; and/or the first camera and the second camera are configured to face downward, toward the ground, as the pole is moved from the first position to the second position.

In certain embodiments, a method for determining a pose in an environment where surveying is impaired comprises determining a first position of a pole using a surveying system, wherein at least a portion of the surveying system is integrated with the pole, and the first position is determined in three dimensions of a coordinate system; determining a first orientation of the pole while the pole is at the first position, wherein the first orientation includes a heading and two degrees of tilt, and a combination of the first position of the pole and the first orientation of the pole provides a first pose of the pole; acquiring a plurality of images using a camera, wherein: the camera is coupled with the pole, and the plurality of images are acquired as the pole is moved from the first position to a second position; processing the plurality of images to calculate a change in pose from the first position to the second position; calculating a second pose of the pole at the second position based on the first pose and the change in pose; receiving data about the second pose from the surveying system; calculating the second pose of the pole further based on the data from the surveying system, wherein the data about the second pose from the surveying system includes data from at least one satellite while there is data from an insufficient number of satellites to form a Global Navigation Satellite System (GNSS) solution; calibrating sensors integrated with the pole before the pole is moved from the first position to the second position, wherein calibration includes revising measurements of the camera in relation to the pole based on input from sensors integrated with the pole, the camera, or both sensors integrated with the pole and the camera; initializing values for sensors integrated with the pole before the pole is moved from the first position to the second position, wherein initialization includes calculating a relation of the camera to the first pose; initializing values for sensors integrated with the pole before the pole is moved from the first position to the second position, wherein initialization includes a determination of scale for the camera; and/or acquiring a second plurality of images, using a second camera, as the pole is moved from the first position to the second position. In some embodiments, the first camera and the second camera are configured to face downward, toward the ground, as the pole is moved from the first position to the second position.

In certain embodiments, an apparatus for surveying comprises a pole, a first camera integrated with the pole, and a second camera integrated with the pole, wherein the pole is an elongate structure having a first end and a second end opposite the first end; the pole has a length in a direction of elongation, the length extending from the first end to the second end; a long axis of the pole is at a center of the pole and extends in a direction of the length of the pole; the pole is a surveying pole, configured to be held vertically during surveying; the first camera has a first optical axis; the first optical axis makes a first angle with the long axis of the pole that is less than 90 degrees measured from the first end of the pole; the second camera has a second optical axis; and/or the second optical axis makes a second angle with the long axis of the pole that is less than 90 degrees measured from the first end of the pole. In some embodiments, the apparatus further comprises at least a portion of a surveying system integrated with the pole; the apparatus further comprises one or more processors configured to determine a first position of the pole using the surveying system, wherein the first position is determined in three dimensions of a coordinate system, acquire a first plurality of images using the first camera and acquire a second plurality of images using the second camera while the pole is moved from the first position to a second position, and process the first plurality of images and the second plurality of images to calculate a change in position from the first position to the second position; the second camera has a different focal length than the first camera; a focal length of the second camera is a fixed focal length; the first optical axis of the first camera is fixed in relation to the long axis of the pole and the second optical axis of the second camera is fixed in relation to the long axis of the pole; the first camera is recessed in the pole so that the first camera is within an outside diameter of the pole; the second camera is positioned farther from the center of the pole than the first camera; the first camera is recessed in the pole such that the first camera is within an outside diameter of the pole; the second camera is in a housing that is outside the outside diameter of the pole; the second camera is separated by at least 25 centimeters and no more than 3 meters from the first camera; the first camera comprises an image sensor and a lens; the image sensor has a sensing surface; the lens is defined by a lens plane; the lens plane is not parallel with the sensing surface of the image sensor; the first camera and the second camera are configured to have overlapping fields of view for stereoscopic vision; and/or the first angle does not equal the second angle.

In certain embodiments, a method for surveying comprises acquiring a first plurality of images using a first camera and acquiring a second plurality of images using a second camera as a pole is moved from a first position to a second position and processing the first plurality of images and the second plurality of images to calculate a change in position from the first position to the second position. In some embodiments, the method comprises moving the pole from the first position to the second position while holding the pole so that the long axis of the pole is vertical, and/or generating stereoscopic images using the first camera and the second camera.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
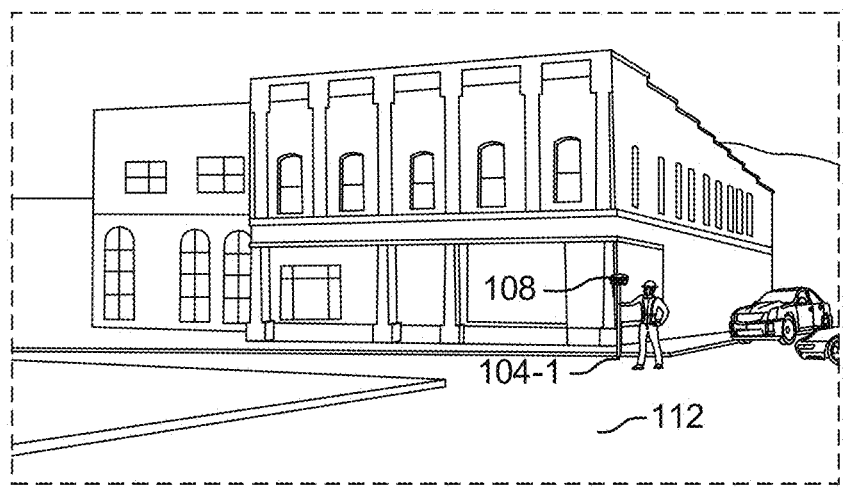
FIG. 1 depicts example measurement points located in GNSS-impaired environments.
Figure 1:
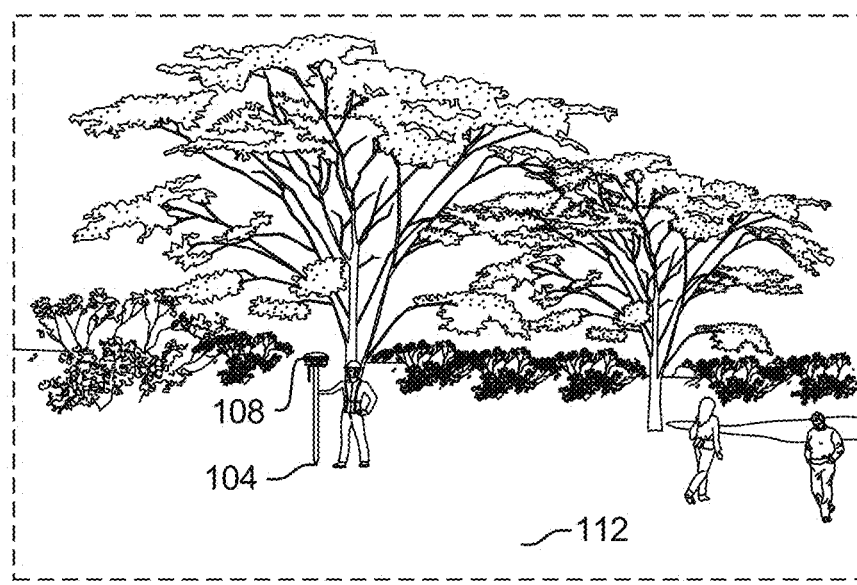
Figure 1:
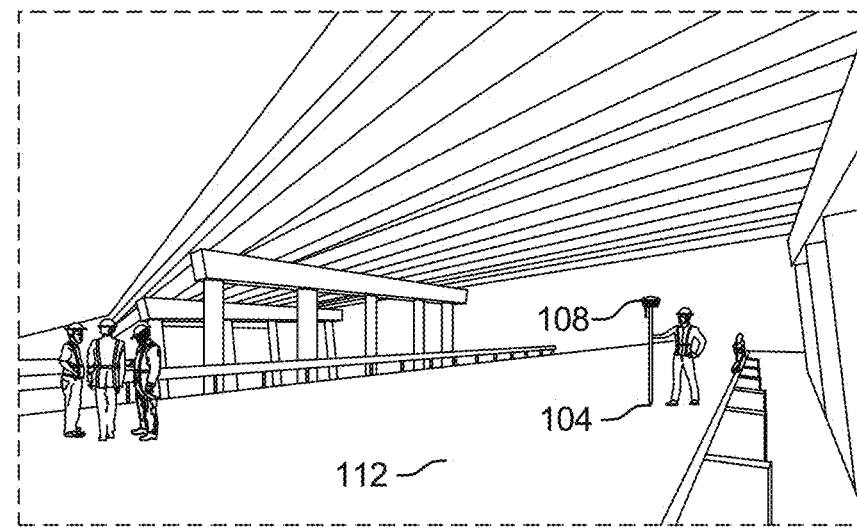

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

This disclosure relates to surveying in GNSS-impaired environments. Trying to determine a precise position (e.g., precision within 5 centimeters) of a point next to an obstruction (e.g., next to a building or under an overpass) using a GNSS receiver can be challenging. Inertial Measurement Units (IMUs; e.g., sensors using accelerometers) can be used to measure changes to relative position. One possible solution would be to use IMUs to calculate a relative position change from a known position in a GNSS-impaired environment. While IMUs can be very accurate for short time periods (e.g., less than 30 seconds), IMU positioning tends to drift. More accurate IMUs can be expensive. Applicant has found that accumulation of errors from using just IMUs (e.g., moderate-cost IMUs) to determine relative position change does not provide sufficient accuracy for using IMUs in surveying (e.g., if surveying in a GNSS-impaired environment takes longer than about 30 seconds).

Another solution uses one or more downward facing cameras on a pole to track relative position change (surface tracking or visual odometry) from a known position to a measurement point. A GNSS receiver is often mounted on a pole to be above a user's head (e.g., to reduce interference from GNSS signals blocked and/or reflected from the user's head). In some embodiments, one or two cameras are mounted on a surveying pole. The camera(s) acquire images (e.g., "take pictures") of the ground as the GNSS receiver is moved from an initial position to a measurement point. One example of image tracking is given in U.S. Pat. No. 9,710,919. GNSS signals are not blocked from the GNSS receiver at the initial position, allowing the GNSS receiver to precisely determine a geodetic position of the GNSS receiver at the initial position. The measurement point is at a location where GNSS signals are fully or partially blocked. Images from the one or two cameras are used to calculate a change in position from the initial position to the measurement point (e.g., using surface tracking). Applicant has found that using optical surface tracking provides more accurate determination of the position of the measurement point than simply using IMUs. In some embodiments, surface tracking is used in combination with IMU data to provide an improved and more robust solution.

Referring first to FIG. 1, example measurement points 104 located in GNSS-impaired environments are shown. A first measurement point 104-1 is shown next to a building. A second measurement point 104-2 is shown next to a tree, and a third measurement point 104-3 is shown under an overpass. It can be difficult to survey locations of measurement points 104 using a GNSS receiver 108 because of obstructions interfering with GNSS signals (e.g., obstructions blocking and/or reflecting GNSS signals). For example, a building interferes with GNSS signals while trying to survey the first measurement point 104-1, a tree interferes with GNSS signals while trying to survey the second measurement point 104-2, and an overpass interferes with GNSS signals while trying to survey the third measurement point 104-3. Yet in each scenario, there are initial positions 112 where the GNSS receiver 108 can be placed to receive GNSS signals. Initial positions 112 in FIG. 1 are shown by way of example; a person of skill in the art will realize there are many initial positions 112 not marked in FIG. 1 where a GNSS receiver 108 can receive GNSS signals. With a ground tracking system integrated with a surveying rod of a GNSS receiver 108, the surveying rod can be moved from a first position (e.g., an initial position 112) to a second position (e.g., measurement point 104) so that a position of the measurement point can be surveyed, even though the GNSS receiver 108 might receive degraded signals, or no signals, from GNSS satellites (e.g., the GNSS receiver might receive signals from only 0, 1, or 2 GNSS satellites).

Figure 2:
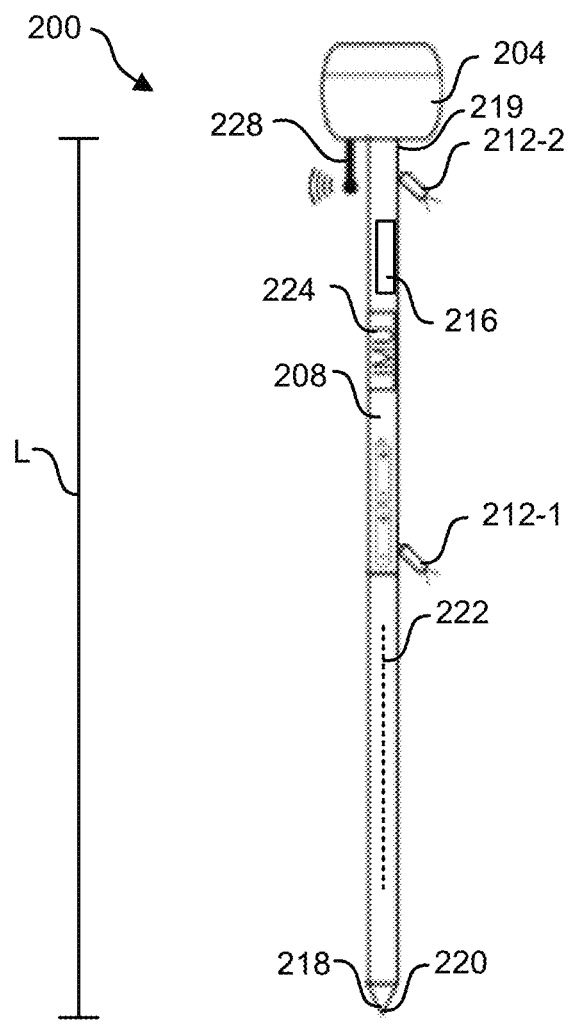
FIG. 2 depicts an embodiment of a system for surveying in a GNSS-impaired environment.

FIG. 2 depicts an embodiment of a system 200 for surveying in a GNSS-impaired environment. The system 200 comprises a receiver 204, a pole 208, a camera 212, and one or more processors 216. The pole 208 is an elongate structure having a first end 218 and a second end 219 opposite the first end 218. The pole has a length L in a direction of elongation of the pole 208, the length L of the pole 208 extending from the first end 218 to the second end 219. A long axis of the pole 208 is at a center 222 of the pole 208 and extends in a direction of the length L of the pole 208. The pole 208 is a surveying pole, configured to be held vertically during surveying. In some embodiments, L is equal to or greater than 1 or 1.5 meters and equal to or less than 1.5, 1.75, 2, 2.5, or three meters.

At least a portion of a surveying system can be integrated with the pole 208 (e.g., receiver 204 coupled with the second end 219 of the pole 208). In FIG. 2, the receiver 204 is a GNSS receiver (e.g., a GPS receiver) configured to provide a first position. The GNSS receiver is part of a GNSS surveying system. In some embodiments, the GNSS receiver is high precision, such as a real-time kinematic (RTK) GNSS receiver. The first position is a geodetic position (e.g., latitude, longitude, and elevation; which is an example of a three-dimensional coordinate system) based on receiving signals from two or more sources. In some embodiments, sources are satellites emitting GNSS signals. The receiver 204 can receive signals from 3, 4, or more satellites to determine the geodetic position. In some embodiments, a source is a land-based source (e.g., from a known location) and emits signals (e.g., radio waves; electromagnetic radiation outside the visible spectrum) that are detected by the receiver 204. In some embodiments, the first position is the initial position 112. In some embodiments, two sources are used to provide positioning in two dimensions. In some embodiments, a clock (e.g., atomic clock) is used with the two sources. Orientation (e.g., roll, pitch, yaw) and/or heading of the system 200 can also be determined while determining the initial position 112. In some embodiments, a maximum number of sources emitting signals that the receiver 204 can receive at one time is limited by a GNSS constellation. For example, in 2019, there were 31 operational GPS satellites. Accordingly, a receiver 204 that is a GPS receiver cannot receive signals from more than 31 satellites at one time. A person of skill in the art will know that a maximum number of satellites that a receiver 204 can receive signals from at one time is much less than 31, depending on satellite orbits. For example, GPS has at least 4 satellites "visible" to a GPS receiver at any given time, but the maximum number of satellites "visible" to the GPS receiver can be 5, 6, 7, 8, 9 or 10. A number of satellites visible to a GNSS receiver can be greatly increased if signals from more than one GNSS system are used (e.g., based on a number of satellites in GNSS systems and orbits of those satellites). In some embodiments, a regional navigation system is used (e.g., Indian Regional Navigational Satellite System (IRNSS)) and/or a ground-based navigation system is used.

The pole 208 is a surveying pole. In some embodiments, the pole 208 is a rover rod for surveying. The receiver 204 is mounted to the pole 208 (e.g., to one end of the pole, opposite a tip 220 of the pole 208). The pole 208 is of known (e.g., measurable) length (e.g., so that a length from the receiver 204 to the tip 220 is known). The tip 220 of the pole 208 is placed at the initial position 112. While the tip 220 of the pole 208 is at the initial position 112, the receiver 204 receives GNSS signals. The geodetic position of the initial position 112 is calculated based on GNSS signals received by the receiver 204 and the known distance from the receiver 204 to the tip 220 (e.g., with an assumption that the pole is straight up and down). In some embodiments, the pole 208 is not placed at a particular point for calibration (e.g., calibration can be "on-the-fly" without having to stop and place the system 200). For example, the system 200 acquires GNSS data, IMU data, and image data. The GNSS data, IMU data, and image data are fused using a filter to determine one or more positions of the system 200 (e.g., using a Kalman filter though other filters and/or algorithms could be used). The system 200 uses the GNSS data, IMU data, and image data in real time to resolve six degrees of freedom of the system 200. The initial position 112 could be one of many positions and/or orientations of the system 200 resolved using GNSS data, IMU data, and image data. Once six degrees of freedom of the system 200 are resolved, the system 200 is calibrated. After the system 200 is calibrated, the system 200 can continue to operate (e.g., determine 6 degrees of freedom of the system 200) with a subset of data (e.g., use image data without GNSS data and/or without IMU data; use GNSS data without image data and/or IMU data; or use IMU data without GNSS data and/or image data). Having calibrated the system 200 for three types of data (e.g., GNSS data, IMU data, and image data) and then being able to use the system 200 with less than all three types of data can make the system 200 more robust and can reduce error (e.g., because of redundancy in data). Each type of data can have different error accumulations. For example IMU data can saturate if the system 200 is moved too quickly, and error in IMU data accumulates over time; image data doesn't have error that accumulates over time, but over distance. Image data can also have errors in images (e.g., not being able to reconcile changes in sequential images). GNSS data is very accurate, but GNSS signals can be blocked or reflected (reflection can cause interference and/or incorrect measurements).

Since the pole 208 might not be aligned with gravity (e.g., straight up and down) while determining the geodetic position of the initial position 112, the system 200 comprises an inertial measurement unit (IMU) 224. The IMU 224 comprises accelerometers that measure tilt of the pole 208. The geodetic position of the initial position 112 can be calculated based on GNSS signals received by the receiver 204, the known distance between the receiver 204 and the tip 220, and calculated tilt of the pole 208 using the IMU 224.

The camera 212 is integrated with the pole 208. The camera 212 is integrated with the pole 208 so that an orientation of the camera is fixed in relation to the pole 208. The camera 212 is facing downward in relation to the pole 208. The pole 208 is an elongate structure having a length (e.g., 2 meters) much longer than a width (e.g., 5 centimeters). For convenience in describing embodiments, "down" in relation to the pole 208 is a direction toward the tip 220 of the pole, and "up" in relation to the pole is a direction toward an end opposite the tip 220 (e.g., toward the receiver 204). Downward facing does not necessarily mean an optical axis of the camera 212 is oriented in a direction parallel with the length of the pole 208, but rather the camera 212 is directed more toward the tip 220 than the end opposite the tip 220. Put another way, assume a camera 212 mounted on the pole 208, directed toward the tip 220, and oriented in a direction parallel to the pole 208 is said to be oriented at zero degrees with respect to the pole; a camera 212 mounted on the pole, directed toward the receiver 204, and oriented in a direction parallel to the pole 208 is said to be oriented at 180 degrees; then downward facing would include directions of angles equal to and greater than zero and less than 90 degrees. Downward facing cameras 212 for ground tracking can have some advantages. The ground is often flat or relatively flat, so that objects on the ground are not as likely to be at different distances. When looking toward the horizon, there is a greater chance that an identified feature is composed of overlapping objects at different distances from the camera, leading to poor localization of the identified feature in 3D space.

The camera 212 is configured to acquire a plurality of images. For example, the camera 212 takes many pictures (e.g., 1, 2, 5, 10, 20, 30, or 60 per second; and/or 1, 2, 5, 10, 25, 50, or per meter based on IMU and/or GNSS distance measurement) as the pole 208 is moved from the initial position 112 to the measurement point 104. The plurality of images are processed (e.g., using the one or more processors 216) to calculate a position change from the first position based on movement observed in the plurality of images (e.g., surface tracking by identifying features on the ground and calculating how the features change orientation and/or positions between images of the plurality of images; using optical flow techniques; and/or using simultaneous localization and mapping (SLAM) techniques). A second position (e.g., the measurement point 104) is calculated (e.g., by the one or more processors 216) based on the first position and the position change calculated from the plurality of images.

In the embodiment shown, the system 200 comprises two cameras 212, a first camera 212-1 and a second camera 212-2, integrated with the pole 208 and oriented downward with respect to the pole. In some embodiments, two cameras 212 are used for stereoscopic ground tracking. Accordingly, the second camera 212-2 acquires another plurality of images used for calculating position change in conjunction with a plurality of images acquired by the first camera 212-1. Images from the first camera 212-1 and images from the second camera 212-2 are synced in time and used together to track features on the ground to calculate the position change from the first position. In some embodiments, the first camera 212-1 and the second cameras 212-2 are at least 0.5, 0.6, 0.75, 0.85, or 1.0 meters from the tip 220 of the pole 208 (e.g., to image a wider area of the ground).

With two cameras 212 facing downward for ground tracking, possibly in combination with the IMU 224, a change in position of the pole 208 can be determined by dead reckoning. The pole has six degrees of freedom: three translational (e.g., x/y/z or latitude, longitude, and elevation) and three rotational (roll, pitch, and yaw). Analysis of movement of features of interest in images from a single camera can estimate relative movement in the six degrees of freedom; multiple images from one camera without additional information does not provide scale. Scale can be determined several ways (e.g., by moving the camera a known distance or imaging two points where a distance between the two points is known). A multi-camera system with overlapping fields of view can resolve scale directly. Integration with other sensors, such as an IMU, can provide additional accuracy and/or robustness to measurements. For example, certain configurations of accelerometers are very good at determining a direction of gravity, and can be used to measure pitch and roll to augment pitch and roll measurements from images because pitch and roll can be challenging to measure from images in some situations.

In some embodiments, one camera is used for ground tracking. In some embodiments, two cameras are used for ground tracking. Relative measurements of six degrees of freedom mentioned in the preceding paragraph are missing scale and orientation to the real world. One camera can measure translations, but cannot convert translations and/or rotations into real dimensions (e.g., metric units) without additional information. Sources for scale include: a second camera viewing the same scene can provide scale information using stereo triangulation (e.g., and by knowing a separation distance between the two cameras); objects or targets in the scene of known size or spacing; knowing a distance to a scene (and intrinsics of the camera, such as focal length of lens used); an external measurement such as a laser range finder or tape measure; optical artifacts in the image such as focus; and/or using GNSS to give a true distance between positions that are also measured with the vision system.

As an example, scale and orientation can be determined by moving the pole 208 from the first position (e.g., the initial position 112) to a baseline position (e.g., a third position before moving the pole 208 to the second position (measurement point 104)). The baseline position is a place where the receiver 204 can receive signals (e.g., from GNSS satellites) to determine a geodetic position of the baseline position. For example, the pole 208 can be moved 3, 4, or 5 meters away from the initial position 112 to an arbitrary baseline position; the receiver 204 is used to receive GNSS signals while the pole 208 is at the arbitrary baseline position; the geodetic position of the arbitrary baseline position is calculated (e.g., using the one or more processors 216); a distance from the initial position 112 to the arbitrary baseline position is calculated (e.g., using the one or more processors 216); and a direction from the initial position 112 to the arbitrary baseline position is calculated (e.g., using the one or more processors 216). In some embodiments, position is calculated to survey-grade performance (e.g., 2-5 cm accuracy), mapping or GIS performance (e.g., 10 cm accuracy), or consumer-grade performance (e.g., 1-3 meter resolution). In some embodiments, the third position is an arbitrary position determined on-the-fly as the pole 208 is moved.

The cameras 212 are integrated with the pole 208 and not the receiver 204. While in some embodiments the cameras 212 can be integrated with the receiver 204, Applicant has found integrating cameras 212 with the receiver 204 introduces problems with thermal management. Further, by integrating cameras 212 with the pole 208, the first camera 212-1 can be separated from the second camera 212-2 by a greater distance than integrating the cameras 212 with the receiver 204. Separating cameras 212 by a greater distance can provide more robust ground tracking.

The system 200 comprises an antenna 228. The antenna 228 can transmit and/or receive data. For example, the processor 216 can receive GNSS data from the receiver 204 via Bluetooth. In some embodiments, wired connections are used (e.g., to pass data from the cameras 212 to the one or more processors 216). In some embodiments, the antenna 228 is used to send data to and/or receive data from a total station. For example, a total station could send position data to the system 200 for calculations at the one or more processors 216. The system 200 can comprise more than one antenna. Antennae can be used for two or more components of the system 200 to communicate with each other and/or to communicate with devices and systems external to the system 200 (e.g., a companion device). For example, antennae can be used to transmit and/or receive data via Bluetooth, WiFi, and/or a long-range or short-range radio (e.g., Cirronet; range of over 100, 200, 400, or 1600 meters).

Figure 3:
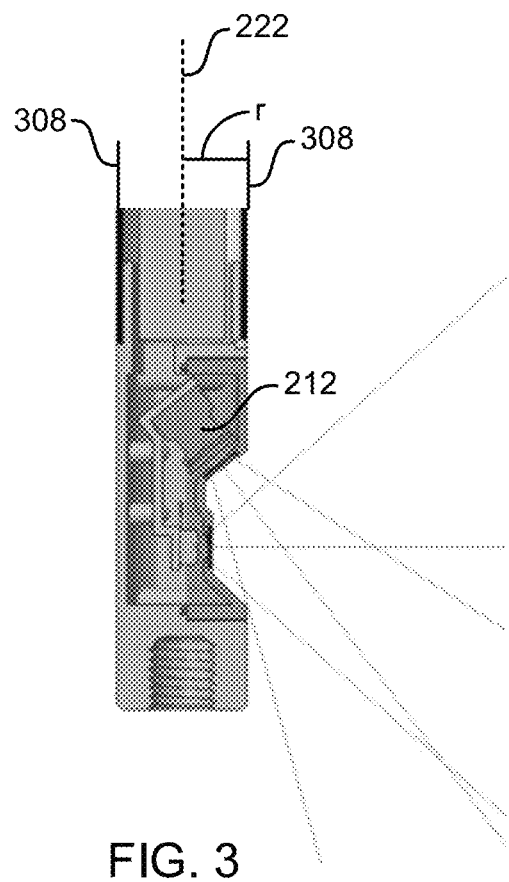
FIG. 3 depicts an embodiment of a recessed camera in a surveying pole.

FIG. 3 depicts an embodiment of a recessed camera 212 in a pole 208. In FIG. 2, a camera 212 can clamp to pole 208 or made as an independent accessory to a surveying pole. In FIG. 3, the camera 212 is integrated in the pole 208.

The pole 208 is defined by a center 222 and an outside diameter 308. The outside diameter is separated from the center 222 by a radius r. The camera 212 in FIG. 3 is recessed in the pole 208 so that the camera 212 is within the outside diameter 308 of the pole 208. In some embodiments, the first camera 212-1 is recessed in the pole 208. In some embodiments, both the first camera 212-1 and the second camera 212-2 are recessed in the pole 208. The camera 212 is integrated with a surveying pole because a surveying pole is a tool many surveyors are already familiar with.

Figure 4:
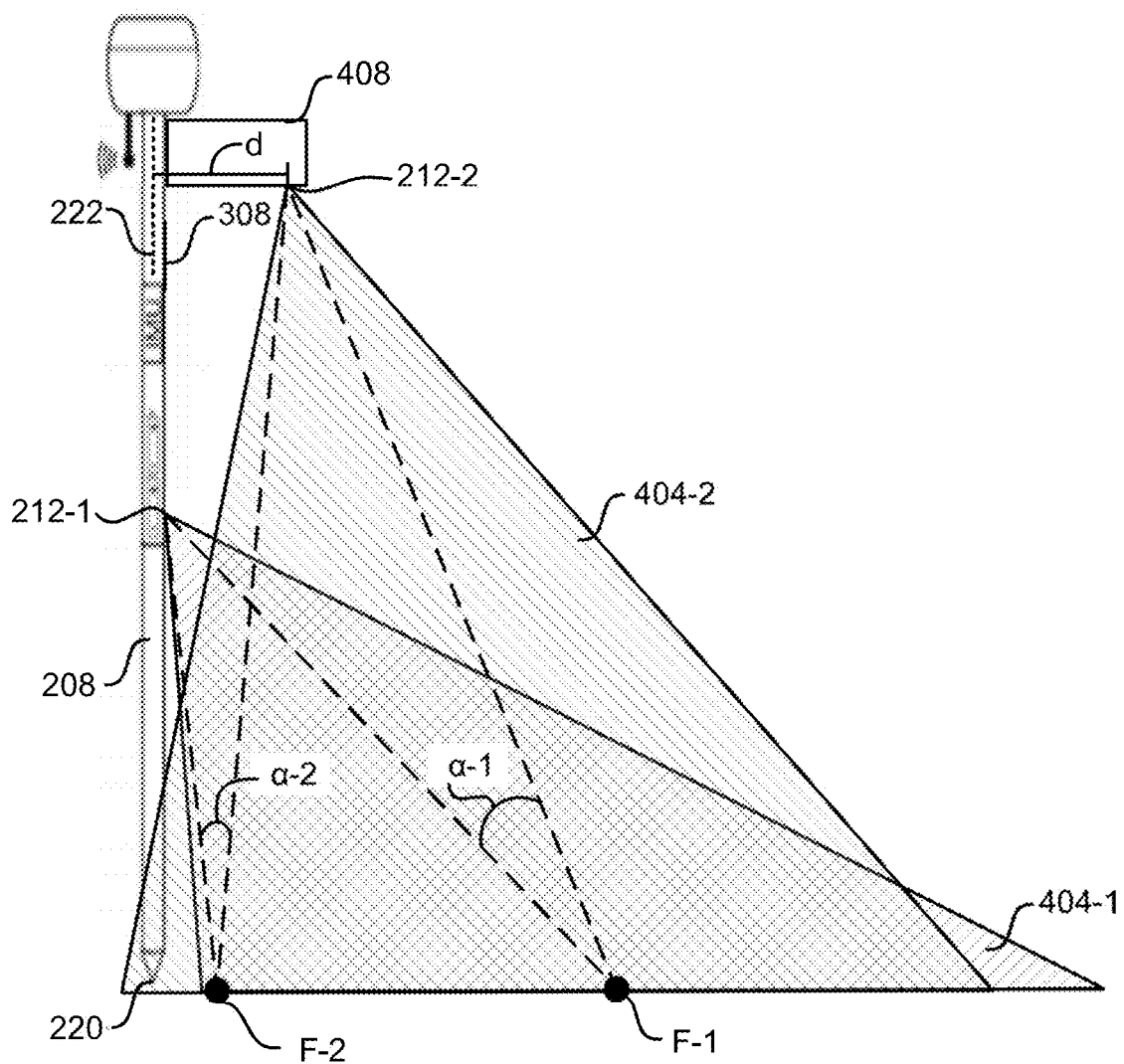
FIG. 4 is a simplified diagram of an embodiment of overlapping fields of view.

FIG. 4 is a simplified diagram of an embodiment of overlapping fields of view of the first camera 212-1 and the second camera 212-2. The first camera 212-1 and the second camera 212-2 are configured to work together as a stereo pair. The first camera 212-1 has a first field of view 404-1. The second camera 212-2 has a second field of view 404-2. The fields of view 404 are defined and overlap (e.g., for stereoscopic vision and/or ground tracking). The second camera 212-2 can be aligned to capture a portion of the pole 208, such as the tip 220 of the pole 208 or a side of the pole 208. In some embodiments, the first field of view 404-1 of the first camera 212-1, which is closer to the tip 220 than the second camera 212-2, does not include the tip 220 of the pole 208 in the first field of view 404-1.

Triangulation of a feature F is used to determine a location of the feature F with respect to the pole 208 (e.g., with respect to the tip 220 of the pole 208). A line from feature F to the first camera 212-1 forms an angle $\alpha$ with a line from feature F to the second camera 212-2. In FIG. 4, the second camera 212-2 is farther from the center 222 of the pole 208 than the first camera 212-1. The second camera 212-2 is integrated in a housing 408, which is integrated with the pole 208, and the second camera 212-2 is separated a distance d from the center 222 of the pole 208. The housing 408 is outside the outside diameter 308 of the pole 208. A first angle $\alpha$-1 corresponds to a first feature F-1, and a second angle $\alpha$-2 corresponds to a second feature F-2. The second feature F-2 is closer to the pole 208 than the first feature F-1. The first angle $\alpha$-1 is larger than the second angle $\alpha$-2. If the second camera 212-2 was mounted the same distance from the center 222 of the pole 208 as the first camera 212-1, the second angle $\alpha$-2 would be near zero and the position of the second feature F-2 would be undetermined using stereoscopic vision of the first camera 212-1 and the second camera 212-2. The second camera 212-2 is positioned farther from the center 222 of the pole 208 so that positions of features F closer to the pole 208 can be determined. The second camera 212-2 can be positioned away from the outside diameter 308 of the pole 208 to image the tip 220 of the pole (e.g., to be used to help place the tip 220 of the pole 208 at a precise location, such as for stake out of an area using GNSS signals as described in U.S. Pat. No. 9,513,120, issued on Dec. 6, 2016, which is incorporated by reference). In some embodiments, the first camera 212-1 is recessed in the pole 208 (e.g., within the outside diameter 308 of the pole for less interference with a user) and/or the second camera 212-2 is outside the outside diameter 308 of the pole 208.

Figure 5:
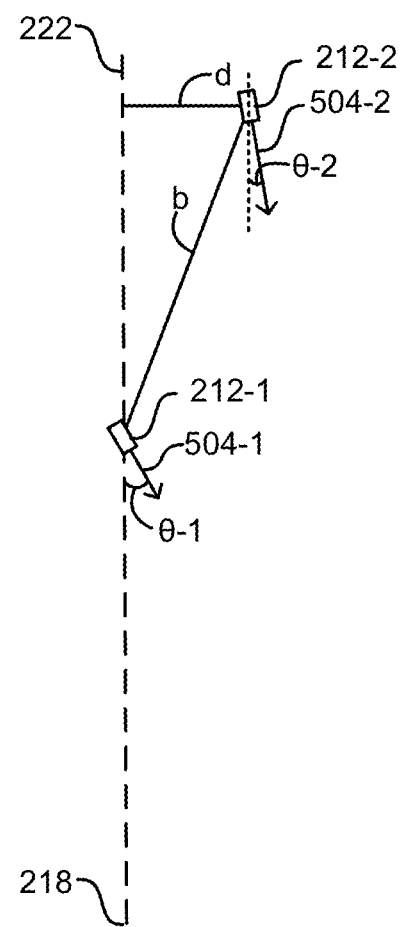
FIG. 5 is a simplified diagram of an embodiment of non-symmetrical orientations of cameras.

FIG. 5 is a simplified diagram of an embodiment of non-symmetrical orientations of cameras 212. FIG. 5 shows the first camera 212-1 and the second camera 212-2. The second camera 212-2 is positioned farther from the center 222 of the pole 208 than the first camera 212-1. The first camera 212-1 is separated from the second camera 212-2 by a camera-separation distance b. Camera separation is sometimes referred to as "baseline" in stereoscopic imaging. In many applications, cameras used for stereoscopic imaging have symmetrical orientation (e.g., there is symmetry about a line halfway between two cameras and perpendicular to a line representing the camera separation. For example, a description on "3D STEREO CAMERA & RENDERING" teaches four possible camera placement options: "Parallel," "Off Axis," "On Axis," and "Radial"; available at http://www.c4dcafe.com/reviews/r13/3dstereo.html, Apr. 8, 2019. In each of these placements, a line of symmetry for camera orientations can be drawn between two cameras, wherein the line of symmetry is perpendicular to a line of camera separation. No such line of symmetry exists in FIG. 5 of this application. Lipton (U.S. Pat. No. 5,142,357) goes further to state that parallel axes are best for "just about any conceivable object . . . " (col. 5, ll. 31-37).

In FIG. 5, the first camera 212-1 has a first optical axis 504-1 and the second camera 212-2 has a second optical axis 504-2. The first optical axis 504-1 makes a first angle θ-1 with the long axis of the pole 208 (e.g., with the center 222 of the pole 208) that is less than 90 degrees, measured from the first end 218 of the pole 208 (e.g., measured from the tip 220 of the pole 208). The second optical axis 504-2 makes a second angle θ-2 with the long axis of the pole 208 that is less than 90 degrees, measured from the first end 218 of the pole 208. Put another way, the optical axes of the cameras 212 are "downward" facing (0<90 degrees) in relation to the pole 208. Cameras 212 in FIG. 2 are "downward" facing. In some embodiments, the first angle θ-1 and/or the second angle θ-2 is equal to or less than 60, 50, 45, 40, 30, or 20 degrees. The first optical axis 504-1 of the first camera 212-1 and the second optical axis 504-2 of the second camera 212-2 are fixed in relation to the center 222 of the pole (e.g., the cameras 212 are attached to the pole 208 so as to block relative movement between the optical axis 504 of the camera 212 and the pole 208).

The first angle θ-1 is greater than the second angle θ-2. In some embodiments the second angle θ-2 is equal to or less than 30, 20, or 10 degrees and/or equal to or greater than 0, 2, or 5 degrees. In some embodiments, the first angle θ-1 is equal to or greater than 10, 15, or 20 degrees. The camera-separation distance b is not parallel with the center 222 of the pole 208 and not perpendicular to the center 222 of the pole 208. Accordingly, the stereoscopic camera setup is unconventional and would not readily work for traditional 3D vision for people. However, Applicant has found that non-symmetrical orientations can provide mathematically accurate calculations for positions of features F. Put another way, optical axes of cameras 212 are not parallel and not symmetric with each other; optical axes are skew and asymmetric with respect to a line perpendicular to camera separation.

The camera-separation distance b for measurement systems can be larger than traditional stereoscopic vision applications. Interpupillary distance (i.e., distance between eyes) generally ranges from 5 to 7 centimeters. For 3D vision applications, camera separation is often not more than 10 centimeters. Though in some 3D rendering, simulated eye separation might be greater than 10 centimeters, for measurement systems, camera separation is usually not greater than 10 centimeters. In some embodiments, the camera-separation distance b is equal to or greater than 25 centimeters (e.g., equal to or greater than 25, 50, or 75 centimeters) and equal to or less than 3 meters (e.g., equal to or less than 1, 1.5, 2, or 3 meters). A longer camera-separation distance b can help improve calculating positions of features F. However, too large of camera separation can be unwieldy for a user. Applicant has found that a camera-separation distance b=1 meter, plus or minus 20 centimeters, is a good engineering comprise. In some embodiments distance d is equal to or greater than 2, 4, 5, 8, 10, or 15 centimeters and equal to or less than 8, 10, 15, 20, or 30 centimeters.

The first camera 212-1 comprises a first lens and a first image sensor. The lens can be a compound lens. The first camera 212-1 has a first focal length, which is a distance between the first lens and the first image sensor while a subject (e.g., the ground) is in focus. The second camera 212-2 comprises a second lens and a second image sensor. The second lens can be a compound lens. The second camera 212-2 has a second focal length, which is a distance between the second lens and the second image sensor while a subject (e.g., the ground) is in focus. In some embodiments, the first focal length is different than the second focal length. For example, the focal length of the first camera 212-1 is shorter than the focal length of the second camera for the first field of view 404-1 to be wider than the second field of view 404-2 (e.g., since the first camera 212-1 is closer to the ground than the second camera 212-2, the first camera 212-1 has a wider-angle lens so that there is more overlap of the first field of view 404-1 and the second field of view 404-2 for imaging the ground). In some embodiments, the focal length of the first camera 212-1 and/or the focal length of the second camera 212-2 are fixed (e.g., for more precise measurements; if focal length of a camera 212 is not fixed it can be challenging to precisely determine the focal length used to acquire an image because focal length of the camera 212 is used for calculating distances).

Figure 6:
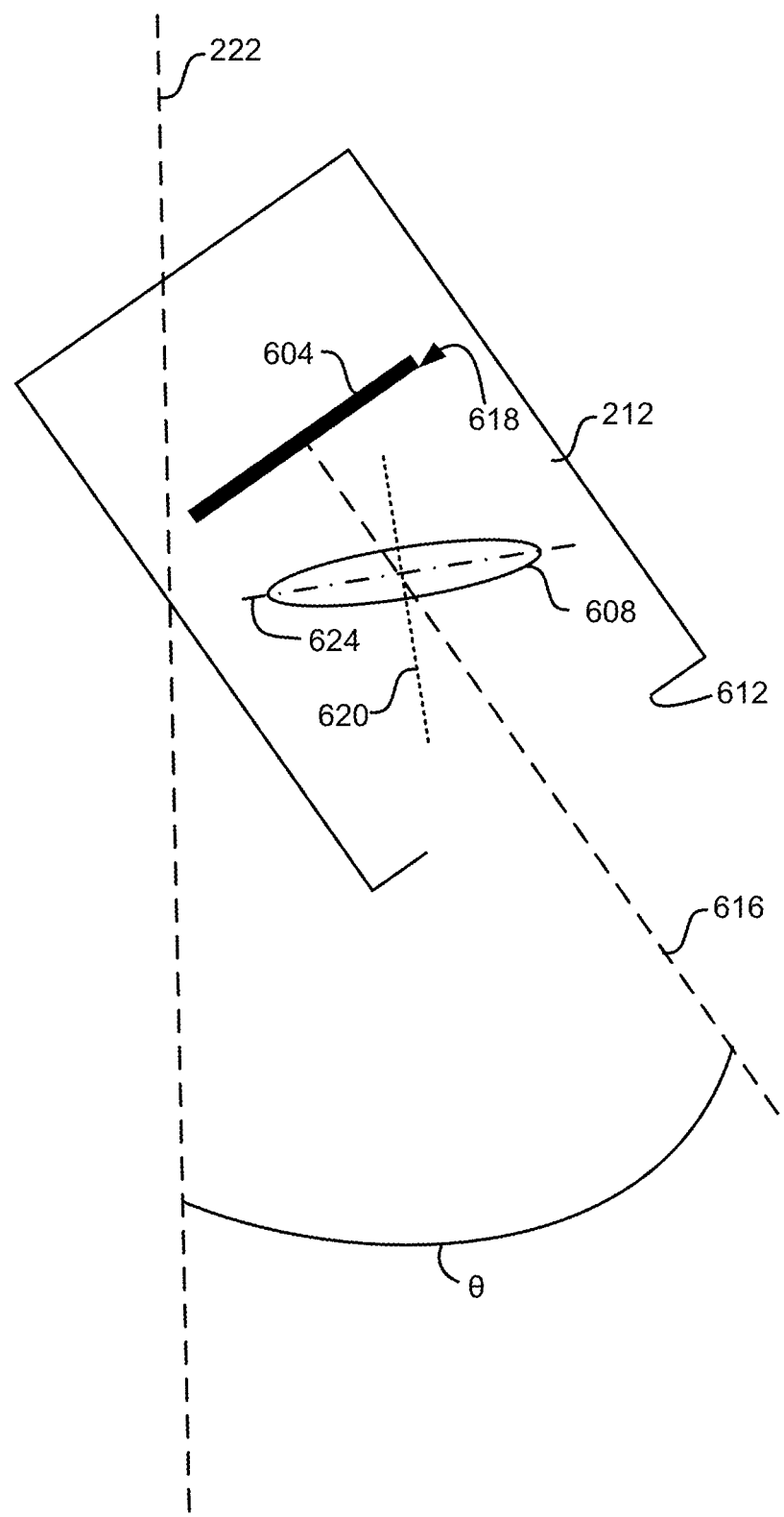
FIG. 6 is a simplified diagram of an embodiment of a camera with a tilted lens.

FIG. 6 is a simplified diagram of an embodiment of a camera 212 having a tilted lens. The camera comprises an image sensor 604, a lens 608, and a wall 612 (or a plurality of walls) forming an aperture that allows light to reach the image sensor 604. The lens 608 is between the aperture and image sensor 604. The camera 212 has an optical axis 616 passing through a center of the aperture (e.g., an optical axis of the aperture is coincident with the optical axis 616 of the camera). The optical axis 616 is normal to an imaging surface 618 (sometimes referred to as a sensing surface) of the image sensor 604. The optical axis 616 of the camera 212 is at an angle θ with respect to the center 222 of the pole 208. The lens 608 is tilted such that an optical axis 620 of the lens 608 does not coincide, and/or is not parallel with, the optical axis 616 of the camera 212. The lens 608 is defined by a lens plane 624 (e.g., a principal plane if the lens is not approximated by a simple lens). The lens plane 624 is not parallel with the imaging surface 618. The lens plane 624 is not parallel with the imaging surface 618 so that a plane of focus of the camera 212 is parallel with the ground while the pole 208 is held vertically. The camera 212 has a wide aperture, which causes the camera 212 to have a smaller depth of field. By tilting the lens plane 624, the plane of focus of the camera 212 covers more surface area of the ground.

Figure 7:
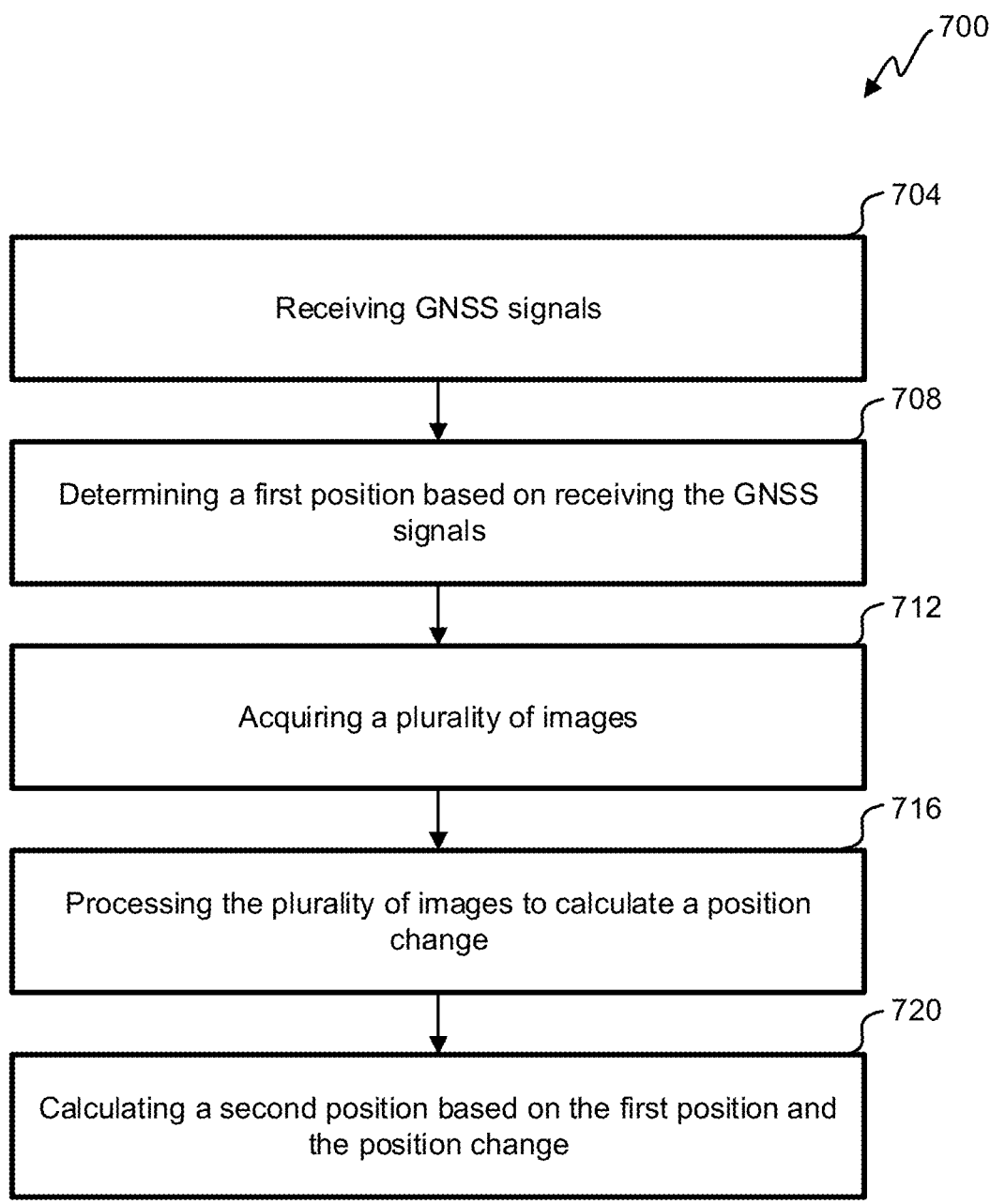
FIG. 7 illustrates a flowchart of an embodiment of a process for surveying in a GNSS-impaired environment.

In FIG. 7, a flowchart of an embodiment of a process 700 for surveying in a GNSS-impaired environment is shown. Process 700 begins in step 704 with receiving GNSS signals (e.g., using receiver 204 mounted on pole 208). Scale and/or orientation can also be determined (e.g., by moving the pole 208 from a first position to a baseline position). In step 708, a first position is determined based on receiving the GNSS signals (e.g., determining the initial position 112). A plurality of images are acquired, step 712, using a camera (e.g., camera 212) as the pole 208 is moved from the first position to a measurement point. In some embodiments, the first camera 212-1 acquires a first plurality of images and the second camera 212-2 acquires a second plurality of images. The camera 212 is integrated with the pole 208 and the camera faces downward in relation to the pole 208. The plurality of images are processed to calculate a position change, step 716, from the first position to the second position (e.g., measurement point 104) based on movement observed in the plurality of images (e.g., ground tracking). In step 720, a second position is calculated based on the first position and the position change calculated from the plurality of images.

In some embodiments, a method comprises moving the pole 208 from a first position (e.g., initial position 112) to a second position (e.g., measurement point 104); acquiring a first plurality of images using the first camera 212-1; acquiring a second plurality of images using the second camera 212-2; and processing the first plurality of images and the second plurality of images to calculate a change in position from the first position to the second position.

Figure 8:
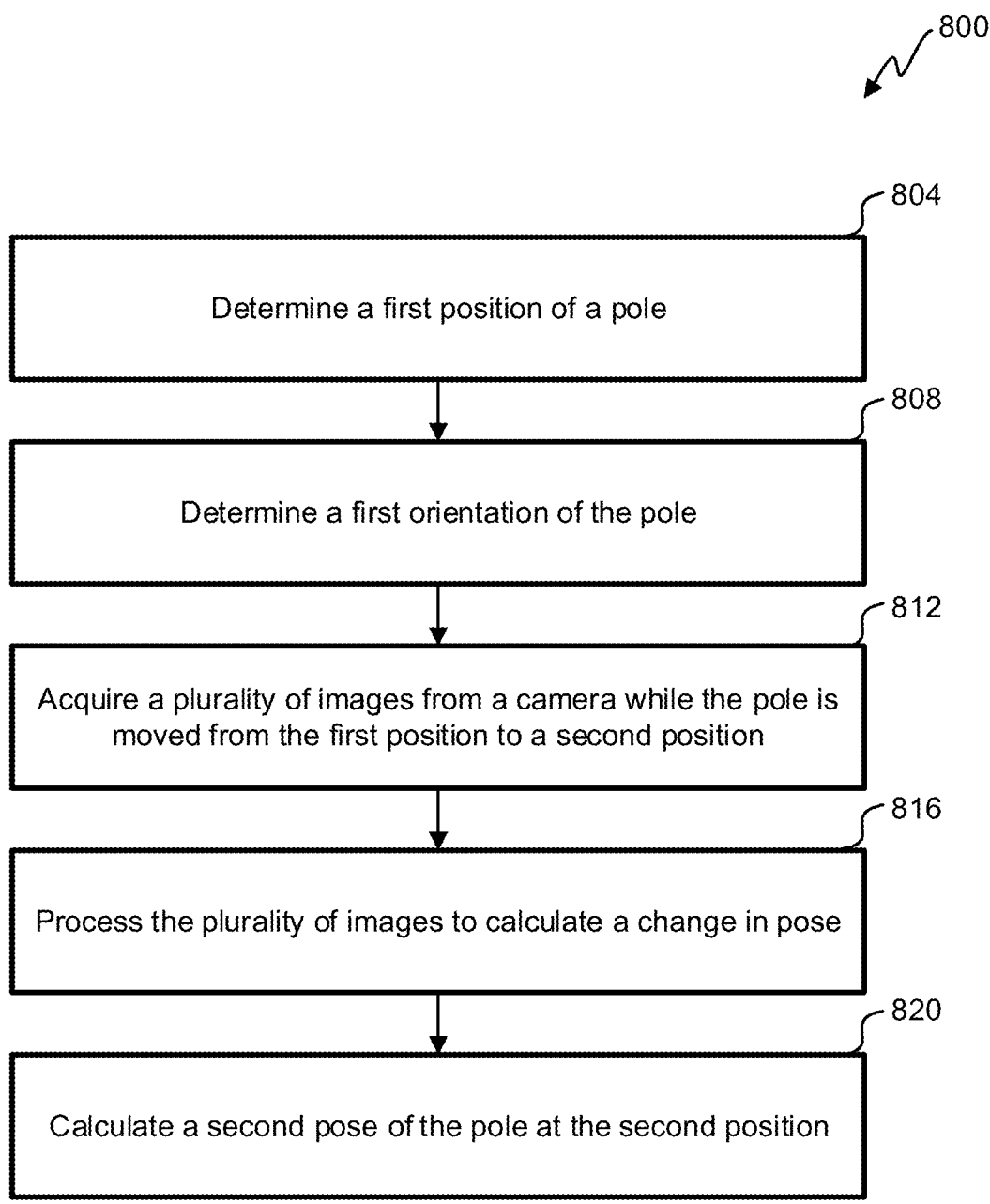
FIG. 8 illustrates a flowchart of an embodiment of a process for determining pose in a GNSS-impaired environment.

FIG. 8 illustrates a flowchart of an embodiment of a process 800 for determining pose in a GNSS-impaired environment. Process 800 begins in step 804 with determining a first position of a pole using a surveying system. At least a portion of the surveying system is integrated with the pole, and the first position is determined in three dimensions of a coordinate system. For example, the portion of the surveying system is a receiver for receiving GNSS signals, and determining the first position is determining latitude, longitude, and altitude of the tip 220 of the pole 208 in a coordinate system of the Earth. As another example, the surveying system includes a total station and the portion of the surveying system includes a target (e.g., reflector) coupled with the second end 219 of the pole 208. The target is tracked by the total station and the position is x, y, z, in a local coordinate system of a worksite. In some embodiments, the tip 220 of the pole 208 is placed on the ground to determine the position of the pole. In some embodiments the pole 208 is not placed on the ground and the position of the pole is determined while a user is moving the pole 208.

In step 808 a first orientation of the pole is determined while the pole is at the first position. Orientation of the pole can be determined in three degrees of freedom (e.g., roll, pitch, yaw). In some embodiments, orientation includes a heading (e.g., yaw) and two degrees of tilt (e.g., roll and pitch). A combination of the first position and the first orientation of the pole provides a first pose. The first pose includes six degrees of freedom (three positions and three orientations).

In some embodiments, determining the first pose includes calibration and/or initialization of the system 200. Functioning of the system 200 can be conceptualized in three phases: calibration, initialization, and operation. Calibration is a process of measuring imperfections and/or relative arrangement of the multiple sensors. Calibration information can be used to improve the measurements. Calibration data is referenced to a common point (e.g., to the tip 220 of the pole 208; or to an origin of a sensor, such as an optical center of a camera, a center of axes for an IMU, a phase center of a GNSS, or a center of a prism). Calibration data can be extrinsic or intrinsic to a sensor. Examples of extrinsic calibration data include positions of sensors relative to each other and/or to the tip 220 and alignment of sensors to each other and/or the tip 220. Examples of intrinsic calibration data include known intrinsic errors/bias, such as measurement of gravity by an accelerometer in the IMU 224 might be a little off by a known amount. Intrinsic calibration data of cameras can include lens distortion, camera center, principal point, and/or focal length. Though factory calibration can be done, and often is, field calibration can also be performed by a user by taking the system 200 through a series of steps. For example temperature can affect some intrinsic calibration data. By the user taking the system 200 through a series of steps, such as moving the pole 208 back and forth, can help calibrate the system 200.

Initialization is a process of establishing values for states (e.g., six degrees of freedom) of the system 200 (e.g., establishing states of the system using multiple sensors). Initialization and operation might not appear as two phases to the user, and implementation may not treat initialization as a discrete state, but rather as a convergence operation. If a system design includes sensors capable of measuring the degrees of freedom, and the calibration of the sensors is well known, then initialization can be skipped.

If initialization is performed, it can be a process upon startup or reset where remaining calibration values are resolved and/or measurements that are not known directly from sensors are established (e.g., by analysis of an aggregate of sensors and/or sensor data). For example, a GNSS receiver with accelerometers and gyros may not have information to determine a direction of north. The GNSS receiver can determine position coordinates from GNSS data (e.g., latitude, longitude, and altitude), a value for "down" from accelerometer measurements of a gravity vector, and rotation data from gyros for when the receiver has been rotated. For the GNSS receiver to initialize a value for north, the system 200 is moved. Two GNSS measurements can establish a vector relative to north, and resulting IMU measurements can be compared to the vector relative to north to determine orientation of the IMU relative to north by sensing in which direction accelerometers measure movement between the two GNSS measurements. Initialization may involve a specific procedure to ensure that measurements are mathematically observable, or it may rely on incidental movement of the system by the user in the course of normal use (e.g., "on-the-fly" initialization).

In an example initialization procedure, the user is instructed to place the tip 220 of the pole 208 on the ground and keep the pole 208 steady to measure a first location (e.g., the initial position 112) accurately and/or to carefully exclude acceleration due to motion from acceleration due to gravity and measure various biases and errors in sensors. The user may then be instructed to lift the pole 208 and move the tip 220 of the pole 208 to a second location (e.g., an arbitrary position) where again, the user holds the system 200 steady. Acceleration from motion measured by the accelerometers would indicate in which direction the IMU is oriented relative to the vector relative to north established by the two GNSS measurements. The user may be instructed to rotate the system in various axes to initialize magnetometers to a local magnetic field so the magnetometers can better determine the direction of north, and so forth.

In another example initialization procedure, a similar outcome can be achieved by making measurements of the system as a result of typical user motion. Various measurements can be processed by the system to calculate initialized values over time (e.g., to converge on estimates of initial parameters). For example, motion calculated from images taken by cameras can be compared to motion sensed by accelerometers in an IMU and compared to time and location information from a GNSS receiver. A method of performing this calculation can include using a Kalman filter or other sensor fusion methodology.

Once the system 200 has been initialized, it will have estimates of measurements using multiple sensors. For the system 200 having the receiver 204 (GNSS), IMU 224, and cameras 212, initialization includes having values for position, heading relative to north, and tilt in two axes relative to gravity in relation to the receiver 204, IMU 224, and cameras 212. An initialized system can have several benefits over relying on individual sensors. The initialized system is capable of providing more accurate measurements. For example, GNSS may exhibit random errors in a position measurement from moment to moment. An IMU of sufficient quality may be more accurate over short time periods (e.g., equal to or less than 1, 10, 20, 30, 60, or 180 seconds depending on a quality of the IMU) making it possible to reduce error of a combined system. Likewise, because of integration from acceleration to velocity to position, the IMU will start to drift over longer periods of time, but a GNSS receiver will not, which reduces error in the combined system. If there is no motion in the system, the integrated measurements from the gyro will start to drift and the system will lose its estimate of heading relative to north, but cameras do not drift over time, so the combined system will show reduced errors.

The initialized system will also be more robust to failure of individual sensors. If GNSS position measurement capability is lost, for example because trees are blocking a view to satellites, then the one or more cameras can be used to continue providing position information. The cameras are able to estimate relative translation and rotation from one image to another provided the fields of view of sequential images overlap sufficiently. If the initial position and orientation of the system is known at the time GNSS is lost, relative movement of the system can be combined with the previous position and orientation to form a new position and orientation. If the camera is temporarily blocked, the IMU is able to provide an estimate of the relative translation and rotation from a previous measurement which can be combined with a previous position and orientation for an update position and orientation, which allows the camera system to recover and begin taking measurements again. The above are examples for illustration. There are many combinations of sensors that can be combined to provide increased accuracy and robustness.

Operation of the system 200 is a steady state functioning of the system wherein measurements are made and position and/or orientation of the system 200 is updated using one or more sensors. In some embodiments, operation of the system 200 continuously updates position and/or orientation based on available measurements and error ranges (e.g., and inputting combining measurements and error ranges using a Kalman filter, a particle filter, a machine learning network, or other sensor fusion mechanism).

In some embodiments, the process 800 further comprises calibrating the system 200 after activating the system 200 (e.g., turning it on) and before the system 200 is moved from the first position to the second position, wherein calibration includes revising measurements of the camera in relation to the pole based on input from the camera and/or sensors integrated with the pole. For example, during calibration the system 200 determines a camera center of the second camera 212-2 has changed in relation to the pole 208 (e.g., because the second camera 212-2 was jolted while the system 200 was placed in the back of a pickup truck). This could be determined by using at least one camera to image a reference point, such as a fixed point on the pole 208 (e.g., the tip 220 or a point near the tip 220), a point on another camera (e.g., a point on the first camera 212-1), or some other reference, and determine the reference point is imaged on a different part of an image sensor of the at least one camera than previously. The second camera 212-2 could also be calibrated by taking position measurements from a GNSS receiver, and movement measurements from the IMU, and determine the optical axis of the second camera 212-2 in relation to the pole 208 has shifted because movement calculated from images of the second camera 212-2 does not match movement calculated by the GNSS receiver and/or the IMU. Another approach is to use photogrammetric techniques, such as using the Fundamental Matrix to calculate relative orientation of two cameras to each other based on detection of naturally occurring features in overlapping fields of view.

In some embodiments, the process 800 further comprises initializing the system 200 before the pole 208 is moved from the first position to the second position, wherein initialization includes calculating a relation of the camera to the first pose. For example, the first pose of the system 200 is determined, which includes a determination on which direction north is. An example of initialization is further described above. A calculation of the relation of the first camera 212-1 to first pose is made by correlating north to a field of view of the first camera 212-1. Initialization can be done before the pole 208 is moved from the first position to the second position, wherein initialization can include a determination of scale for the camera.

In step 812, a plurality of images from a camera (e.g., camera 212) are acquired while the pole is moved from the first position to a second position. For example, a user moves the pole 208 from the first position (e.g., the initial position 112) to the second position (e.g., measurement point 104). While moving the pole 208, the first camera 212-1 takes pictures of the ground. In some embodiments, only one camera 212 is used for ground tracking. If the surveying system (e.g., GNSS or using a total station) suffers from reduced performance, camera(s) 212 allow for continued operation of the system 200. In some embodiments, GNSS and total stations are referred to as primary surveying systems.

In some embodiments, two cameras are used for ground tracking (e.g., both the first camera 212-1 and the second camera 212-2). The camera 212 is coupled with the pole (e.g., integrated with the pole 208 as shown in FIG. 3, or clamped onto the pole 208 as an accessory to the pole 208).

The plurality of images are processed to calculate a change in pose from the first position to the second position, step 816. For example, the camera is configured to face downward, toward the ground, as the pole is moved from the first position to the second position, and features in images are tracked to determine movement of the pole 208. In step 820, a second pose at the second position is calculated based on the first pose and the change in pose. In some embodiments, the pole 208 is placed on the ground at the second position. In some embodiments, the pole 208 is not set down on the ground between the first position and the second position. In some embodiments, the pole 208 is not set down on the ground at the second position.

There are two coordinate systems that measurements can be taken in: (1) body frame, and (2) fixed frame. The body frame is motion and/or orientation relative to the pole 208. The fixed frame is a coordinate system external to the pole 208. The fixed frame can be geodetic coordinates (e.g., latitude, longitude, altitude) or pose (e.g., latitude, longitude, altitude, heading, and tilt). Heading can be relative to north, and tilt can have degrees of freedom (pitch and roll) relative to gravity. Accordingly, there are 6 degrees of freedom. Different applications have different requirements regarding a set of measurements used. The fixed frame can be a job specific coordinate system, such as distance (x, y, z) from a southwest corner of a building with axes aligned to outer walls of the building.

Multiple sensors can be used to provide pose information of the system 200. Some sensors provide body frame measurements; some provide fixed frame measurements. Some sensors are integrated fully in the system 200 (e.g., an IMU). Other sensors can be partially external to the pole 208 (e.g., a total station is used to survey the position of the pole 208;

the pole 208 can have a reflector or lights on it as a target for the total station). Examples of sensors include:

- a GNSS receiver for providing fixed frame position (e.g., latitude, longitude, altitude) with varying degrees of accuracy down to "precise positioning" accuracy, to better than a centimeter in some cases.
- Optical systems such as total stations or scanners provide fixed-frame measurements relative to the frame they've been set up in, e.g., for outdoor use, optical systems are often referenced to geodetic measurements (e.g., latitude, longitude, altitude), while indoors, total stations are often referenced to a job-specific frame.
- Accelerometers provide body frame measurements of acceleration. Each accelerometer provides a measurement along one axis referenced to the sensor (e.g., "forward" rather than "north"). Acceleration measurements can be integrated into velocities and double integrated into translations along that axis.
- Gyroscopes provide body frame measurements of rotation rate. A gyroscope provides a measurement around one axis referenced to the sensor (e.g., "forward"). Rotation rates can be integrated into rotations around that axis.
- Magnetometers provide measurements of local magnetic field strength and direction, which can be used to estimate an absolute direction to the magnetic north pole.
- One camera and associated processor can provide relative measurements of 3 axes of translation "up to a scale" and 3 axes of rotation in the body frame. The body frame of the camera is typically defined by an alignment of rows and columns of pixels on an image sensor (CCD, CMOS, film, etc.), and a normal to the sensor surface. Rotations can be measured in degrees around each axis. Translations along each axis are resolved up to a scale.
- One camera and associated processor may image and identify landmarks in an image. If the location and/or orientation of these landmarks are known in the fixed frame, then the camera may provide absolute measurements of position and/or orientation.
- Two or more cameras with known relative pose (offsets and rotations) that image a common scene can additionally provide scale to points in that scene.

In some embodiments, data from other sensors in addition to the camera 212 are used to calculate the change in pose. For example, receiving data about the second pose from an inertial measurement unit, and calculating the second pose of the pole further based on data from the inertial measurement unit, can increase accuracy and robustness of the system 200.

Figure 9:
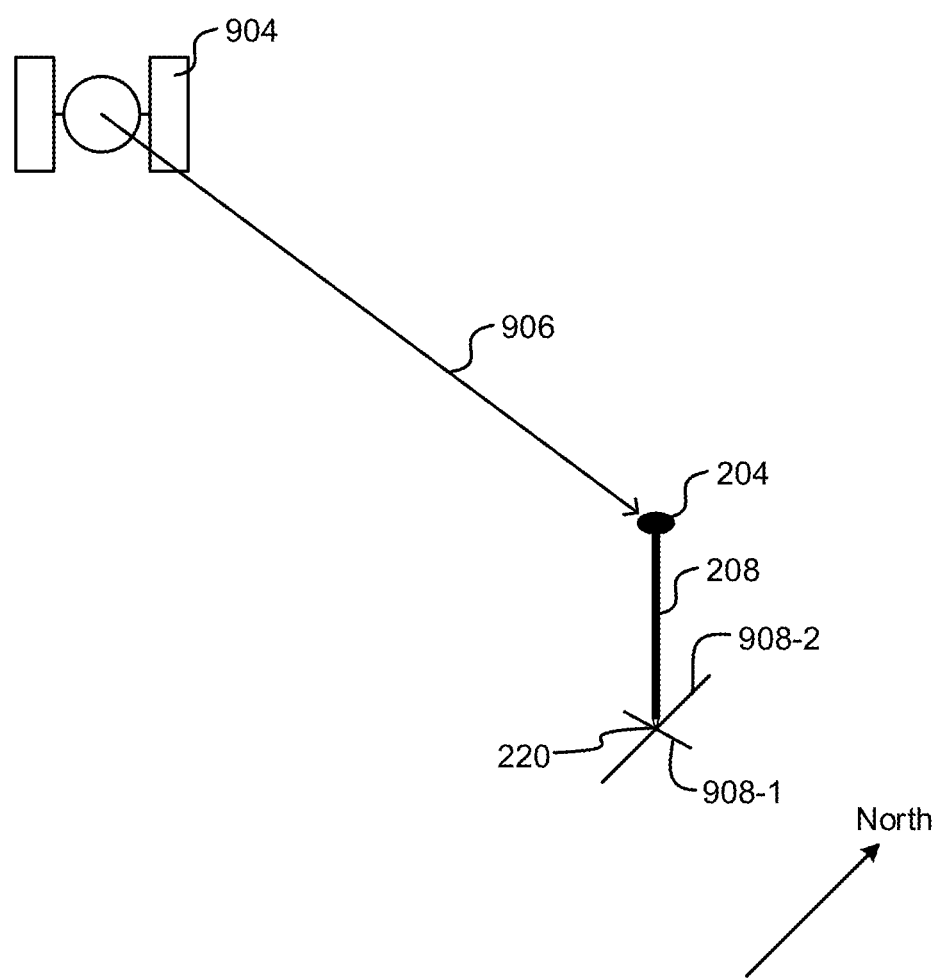
FIG. 9 shows an example using partial data from a surveying system for determining pose.

FIG. 9 shows an example using partial data from a surveying system for determining a second position of the system 200. Partial data about the second pose is received from the surveying system. For example, a receiver 204 is a GNSS receiver and can receive data from one, two, or three satellites, but not more than one, two, or three satellites. Usually four satellites are used to calculate a position of a rover (e.g., three for three degrees of positional freedom and one for clock information). Even though the receiver 204 might not be able to receive signals from four satellites, data from satellites can be still be used to limit error in position of the system 200.

Partial data from more than three satellites can be used. In some embodiments, data about a pose of the pole 208 includes data from at least one satellite while there is data from an insufficient number of satellites to form a GNSS solution. For example, the GNSS receiver could receive data from two GPS satellites, two GLONASS satellites, and/or two Galileo satellites. Even though the GNSS receiver does not receive sufficient data (e.g., from four satellites) in one GNSS constellation to form a GNSS solution, data from one or multiple GNSS constellations can still be used to reduce error in measurements (e.g., GNSS data can be used to reduce error in camera positioning data and/or IMU data even though the GNSS data does not form a GNSS solution). In another example, data about the pose of the pole 208 includes data from only one, two, or three satellites.

FIG. 9 depicts the pole 208, the receiver 204, and a satellite 904. The receiver 204 receives GNSS signals 906 from the satellite 904. The satellite 904 is due west of the receiver 204. By using GNSS signals 906 from the satellite 904, the system 200 can reduce positioning error of the pole 208 in one dimension, east and west. FIG. 9 shows a first error range 908-1 and a second error range 908-2. The first error range 908-1 is an error of east-west positioning of the tip 220 of the pole 208. The second error range 908-2 is an error of north-south positioning of the tip 220 of the pole 208. The first error range 908-1 is less than the second error range 908-2 because the first error range 908-1 is bounded based on data from the satellite 904. The error ranges 908 are exaggerated to show detail (e.g., the first error range 908-1 could be 10 centimeters or less). Thus partial data from a surveying system (e.g., a GNSS surveying system) can be used even if full data from a surveying system is not available.

In some embodiments, the process 800 further comprises receiving data about the second pose from the surveying system, and calculating the second pose of the pole further based on the data from the surveying system, and optionally the data about the second pose from the surveying system includes data from at least one satellite and no more than two satellites in a GNSS system.

Figure 10:
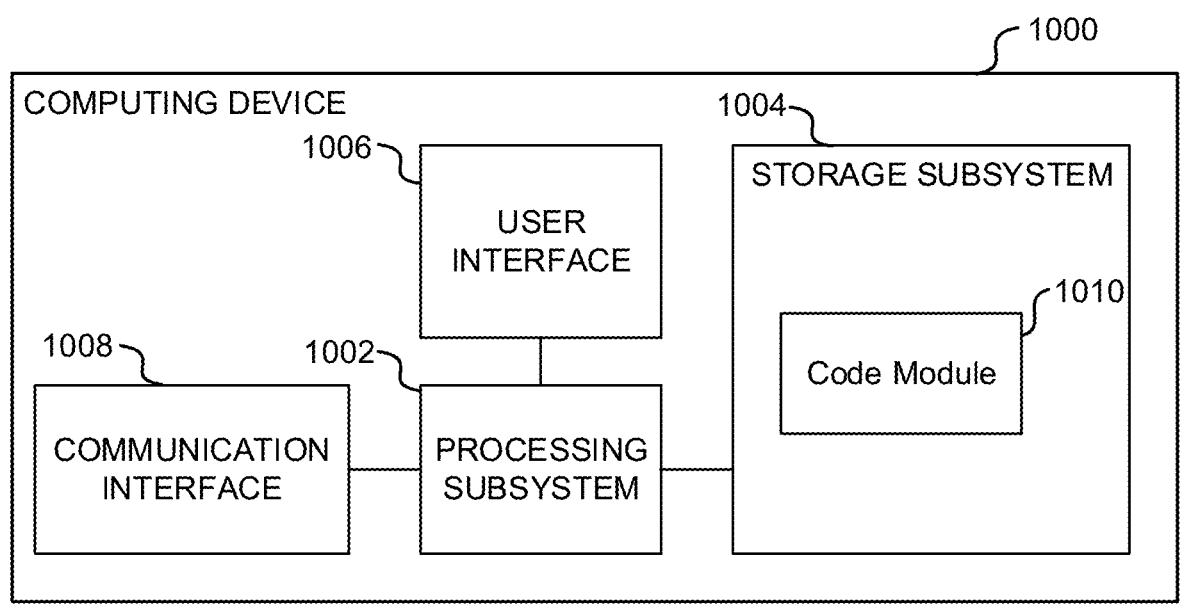
FIG. 10 depicts a block diagram of an embodiment of a computer system.

FIG. 10 is a simplified block diagram of a computing device 1000. Computing device 1000 can implement some or all functions, behaviors, and/or capabilities described above that would use electronic storage or processing, as well as other functions, behaviors, or capabilities not expressly described. Computing device 1000 includes a processing subsystem 1002, a storage subsystem 1004, a user interface 1006, and/or a communication interface 1008. Computing device 1000 can also include other components (not explicitly shown) such as a battery, power controllers, and other components operable to provide various enhanced capabilities. In various embodiments, computing device 1000 can be implemented in a desktop or laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 1004 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 1004 can store one or more applications and/or operating system programs to be executed by processing subsystem 1002, including programs to implement some or all operations described above that would be performed using a computer. For example, storage subsystem 1004 can store one or more code modules 1010 for implementing one or more method steps described above.

A firmware and/or software implementation may be implemented with modules (e.g., procedures, functions, and so on). A machine-readable medium tangibly embodying instructions may be used in implementing methodologies described herein. Code modules 1010 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module 1010) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 1010 may comprise sets of instructions (codes) embodied on a computer-readable medium that directs a processor of a computing device 1000 to perform corresponding actions. The instructions may be configured to run in sequential order, in parallel (such as under different processing threads), or in a combination thereof. After loading a code module 1010 on a general purpose computer system, the general purpose computer is transformed into a special purpose computer system.

Computer programs incorporating various features described herein (e.g., in one or more code modules 1010) may be encoded and stored on various computer readable storage media. Computer readable media encoded with the program code may be packaged with a compatible electronic device, or the program code may be provided separately from electronic devices (e.g., via Internet download or as a separately packaged computer-readable storage medium). Storage subsystem 1004 can also store information useful for establishing network connections using the communication interface 1008.

User interface 1006 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital-to-analog or analog-to-digital converters, signal processors, etc.). A user can operate input devices of user interface 1006 to invoke the functionality of computing device 1000 and can view and/or hear output from computing device 1000 via output devices of user interface 1006. For some embodiments, the user interface 1006 might not be present (e.g., for a process using an ASIC).

Processing subsystem 1002 can be implemented as one or more processors (e.g., integrated circuits, one or more single-core or multi-core microprocessors, microcontrollers, central processing unit, graphics processing unit, etc.). In operation, processing subsystem 1002 can control the operation of computing device 1000. In some embodiments, processing subsystem 1002 can execute a variety of programs in response to program code and can maintain multiple concurrently executing programs or processes. At a given time, some or all of a program code to be executed can reside in processing subsystem 1002 and/or in storage media, such as storage subsystem 1004. Through programming, processing subsystem 1002 can provide various functionality for computing device 1000. Processing subsystem 1002 can also execute other programs to control other functions of computing device 1000, including programs that may be stored in storage subsystem 1004.

Communication interface 1008 can provide voice and/or data communication capability for computing device 1000. In some embodiments, communication interface 1008 can include radio frequency (RF) transceiver components for accessing wireless data networks (e.g., Wi-Fi network; 3G, 4G/LTE; etc.), mobile communication technologies, components for short-range wireless communication (e.g., using Bluetooth communication standards, NFC, etc.), other components, or combinations of technologies. In some embodiments, communication interface 1008 can provide wired connectivity (e.g., universal serial bus, Ethernet, universal asynchronous receiver/transmitter, etc.) in addition to, or in lieu of, a wireless interface. Communication interface 1008 can be implemented using a combination of hardware (e.g., driver circuits, antennas, modulators/demodulators, encoders/decoders, and other analog and/or digital signal processing circuits) and software components. In some embodiments, communication interface 1008 can support multiple communication channels concurrently. In some embodiments the communication interface 1008 is not used.

It will be appreciated that computing device 1000 is illustrative and that variations and modifications are possible. A computing device can have various functionality not specifically described (e.g., voice communication via cellular telephone networks) and can include components appropriate to such functionality.

Further, while the computing device 1000 is described with reference to particular blocks, it is to be understood that these blocks are defined for convenience of description and are not intended to imply a particular physical arrangement of component parts. For example, the processing subsystem 1002, the storage subsystem, the user interface 1006, and/or the communication interface 1008 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Electronic devices described herein can be implemented using computing device 1000.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain the principles of the invention and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

What is claimed is:

1. An apparatus for determining position in an environment where surveying is impaired, the apparatus comprising:
   a pole having a first end and a second end;
   at least a portion of a surveying system integrated with the pole;
   a first camera and a second camera integrated with the pole, wherein:
      the first camera is closer to the first end than the second camera; and
      both the first camera and the second camera have an angle of orientation of less than 90 degrees in relation to the pole, measured from the first end of the pole, wherein the first camera and the second camera are configured to face downward, toward the ground, as the pole is moved from a first position to a second position; and
   one or more processors configured to:
      determine the first position of the pole using the surveying system, wherein the first position is determined in three dimensions of a coordinate system;
      determine a first orientation of the pole while the pole is at the first position, wherein:
         the first orientation includes a heading and two degrees of freedom of tilt; and
         a combination of the first position of the pole and the first orientation of the pole provides a first pose of the pole;
      acquire a plurality of images using the first camera and the second camera, wherein the plurality of images are acquired as the pole is moved from the first position to the second position;
      process the plurality of images to calculate a change in pose from the first position to the second position; and
      calculate a second pose of the pole at the second position based on the first pose and the change in pose.

2. The apparatus of claim 1, wherein:
   the surveying system is a Global Navigation Satellite System (GNSS) surveying system, and
   the at least the portion of the surveying system integrated with the pole is a GNSS receiver.

3. The apparatus of claim 1, wherein:
   the surveying system comprises a total station and a target, and
   the at least the portion of the surveying system integrated with the pole is the target.

4. The apparatus of claim 1, wherein calculating the second pose of the pole is further based on data from the surveying system.

5. The apparatus of claim 4, wherein data from the surveying system used for calculating the second pose of the pole includes data from at least one satellite of a Global Navigation Satellite System (GNSS) while there is data from an insufficient number of satellites to form a GNSS solution.

6. The apparatus of claim 1, further comprising an inertial measurement unit integrated with the pole, wherein calculating the second pose is further based on data from the inertial measurement unit as the pole is moved from the first position to the second position.

7. The apparatus of claim 1, wherein the one or more processors are further configured to calibrate sensors integrated with the pole before the pole is moved from the first position to the second position, wherein calibration includes revising measurements of the first camera in relation to the pole based on input from sensors integrated with the pole, the first camera, or both sensors integrated with the pole and the first camera.

8. The apparatus of claim 1, wherein the one or more processors are further configured to initialize values for sensors integrated with the pole before the pole is moved from the first position to the second position, wherein initialization includes calculating a relation of the first camera to the first pose.

9. The apparatus of claim 1, wherein the one or more processors are further configured to initializing values for sensors integrated with the pole before the pole is moved from the first position to the second position, wherein initialization includes a determination of scale for the first camera.

10. The apparatus of claim 1, wherein:
the one or more processors are configured to survey the second position, based on the second pose of the pole at the second position;
the second position is surveyed while the surveying system is impaired; and
a tip of the first end of the pole is placed at the second position during surveying the second position.

11. A method for determining pose in an environment where surveying is impaired, the method comprising:
determining a first position of a pole using a surveying system, wherein:
at least a portion of the surveying system is integrated with the pole;
the pole has a first end and a second end; and
the first position is determined in three dimensions of a coordinate system;
determining a first orientation of the pole while the pole is at the first position, wherein:
the first orientation includes a heading and two degrees of freedom of tilt; and
a combination of the first position of the pole and the first orientation of the pole provides a first pose of the pole;
acquiring a plurality of images using a first camera and a second camera, wherein:
the first camera and the second camera are coupled with the pole;
the first camera is closer to the first end than the second camera; and
both the first camera and the second camera have an angle of orientation of less than 90 degrees in relation to the pole, measured from the first end of the pole, wherein the first camera and the second camera are configured to face downward, toward the ground, as the pole is moved from the first position to a second position; and
the plurality of images are acquired as the pole is moved from the first position to the second position;
processing the plurality of images to calculate a change in pose from the first position to the second position; and
calculating a second pose of the pole at the second position based on the first pose and the change in pose.

12. The method of claim 11, further comprising:
receiving data about the second pose from the surveying system; and
calculating the second pose of the pole further based on the data from the surveying system, wherein the data about the second pose from the surveying system includes data from at least one satellite while there is data from an insufficient number of satellites to form a Global Navigation Satellite System (GNSS) solution.

13. The method of claim 11, further comprising calibrating sensors integrated with the pole before the pole is moved from the first position to the second position, wherein calibration includes revising measurements of the first camera in relation to the pole based on input from sensors integrated with the pole, the first camera, or both sensors integrated with the pole and the first camera.

14. The method of claim 11, further comprising initializing values for sensors integrated with the pole before the pole is moved from the first position to the second position, wherein initialization includes calculating a relation of the first camera to the first pose.

15. The method of claim 11, further comprising initializing values for sensors integrated with the pole before the pole is moved from the first position to the second position, wherein initialization includes a determination of scale for the first camera.

16. The method of claim 11, wherein:
the method comprises surveying the second position, based on the second pose of the pole at the second position;
the second position is surveyed while the surveying system is impaired; and
a tip of the first end of the pole is placed at the second position during surveying the second position.

17. A memory device comprising instructions that, when executed, cause one or more processors to perform the following steps for determining pose in an environment where surveying is impaired:
determining a first position of a pole using a surveying system, wherein:
at least a portion of the surveying system is integrated with the pole;
the pole has a first end and a second end; and
the first position is determined in three dimensions of a coordinate system;
determining a first orientation of the pole while the pole is at the first position, wherein:
the first orientation includes a heading and two degrees of freedom of tilt; and
a combination of the first position of the pole and the first orientation of the pole provides a first pose of the pole;
acquiring a plurality of images using a first camera and a second camera, wherein:
the first camera and the second camera are coupled with the pole;
the first camera is closer to the first end than the second camera; and
both the first camera and the second camera have an angle of orientation of less than 90 degrees in relation to the pole, measured from the first end of the pole, wherein the first camera and the second camera are configured to face downward, toward the ground, as the pole is moved from the first position to a second position; and
the plurality of images are acquired as the pole is moved from the first position to the second position;
processing the plurality of images to calculate a change in pose from the first position to the second position; and
calculating a second pose of the pole at the second position based on the first pose and the change in pose.

18. The memory device of claim 17 wherein the instructions cause the one or more processors to perform the following steps:
receiving data about the second pose from the surveying system; and calculating the second pose of the pole further based on the data from the surveying system, wherein the data about the second pose from the surveying system includes data from at least one satellite while there is data from an insufficient number of satellites to form a Global Navigation Satellite System (GNSS) solution.

19. The memory device of claim 17 wherein:

the surveying system is a Global Navigation Satellite System (GNSS) surveying system, and the at least the portion of the surveying system integrated with the pole is a GNSS receiver; or the surveying system comprises a total station and a target, and the at least the portion of the surveying system integrated with the pole is the target.

20. The memory device of claim 17, wherein calculating the second pose is further based on data from an inertial measurement unit integrated with the pole, as the pole is moved from the first position to the second position.

\* \* \* \* \*